No. 891,403.
PATENTED JUNE 23, 1908.
J. D. BURGESS.
DRAFT EVENER.
APPLICATION FILED MAY 12, 1906.
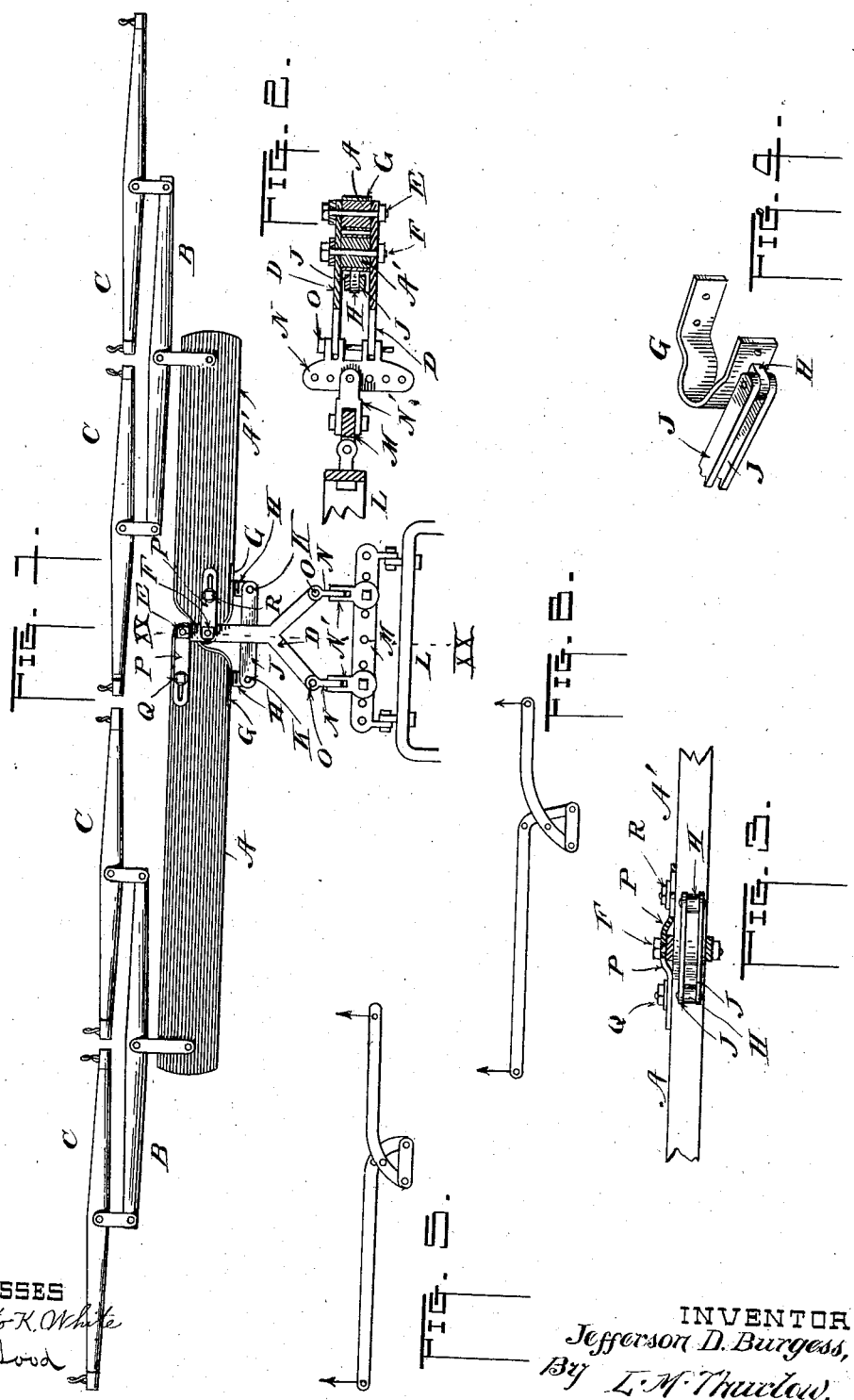
WITNESSES
Loretto K. White
C. A. Good
INVENTOR
Jefferson D. Burgess,
By L. M. Thurlow,
Atty.

UNITED STATES PATENT OFFICE.

JEFFERSON D. BURGESS, OF CANTON, ILLINOIS.

DRAFT-EVENER.

No. 891,403.   Specification of Letters Patent.   Patented June 23, 1908.

Application filed May 12, 1906. Serial No. 316,538.

*To all whom it may concern:*

Be it known that I, JEFFERSON D. BURGESS, citizen of the United States, residing at Canton, in the county of Fulton and State of Illinois, have invented certain new and useful Improvements in Draft-Eveners; and I do hereby declare that the following is a full, clear, and exact description of the invention, which will enable others skilled in the art to which it appertains to make and use the same.

This invention relates to that class of devices known as draft equalizers or eveners. The said invention relates more particularly to eveners for use on plows but is equally well adapted for other implements as is obvious.

The primary object, as in all eveners, is to so attach the back double-tree to the plow that all four horses can freely work without crowding one another, that each horse can walk straight in its tugs or traces immediately ahead of its own swingle tree, and also that each said horse and each team of horses can pull an equal amount. It is well known that the horses in all eveners and especially in four-abreast eveners do not pull straight ahead in their traces, the conditions being such that the several swingle-trees are normally held to one side instead of directly behind the horses, this being especially true as regards the horse at the right which is termed the "furrow-horse".

As already stated it has always been the purpose in constructing eveners, to so arrange them with reference to their point of attachment with the plow that the swingle-trees can be brought directly behind the horses so there shall be no crowding and also that each animal shall be enabled to pull equally with its neighbors. With this object in view the evener about to be described has been designed wherein by its peculiar construction and slight modifications thereof the much sought for results are attained. To the end that the invention may be fully understood the accompanying drawing is provided in which;

Figure 1 is a top view of my evener showing its draft attachment. Fig. 2 is a transverse sectional elevation of the device through line X X, Fig. 1. Fig. 3 is a rear elevation of portions of the back double-tree showing certain parts in section. Fig. 4 is a perspective view of a fitting to be fastened to one end of each double-tree section showing a lug thereon and connecting members. Fig. 5 is a diagram of a pair of levers for illustrating the principle of my evener. Fig. 6 is a similar view showing a change of proportion in the length of the levers.

A and A' indicate two members which constitute the back double-tree of the evener, and B, B are the two double-trees to which are attached the pairs of swingle-trees C, C. In all other eveners of which I am aware, the back double-tree is one rigid member while mine as stated, and as shown, is composed of the two separate members wherein lies the importance of the device as will be presently understood. Said double-tree is the same length as all others, namely, 60 inches, this being as short as it is possible to make it in order to admit of the use of the four swingle-trees of 30 inches each to lie end to end without interfering with one another. If made in one piece the middle of the double-tree would be the point of attachment to the plow as a natural consequence since by that means the two teams would have an equal pull. But since such a condition would carry the horses too far to the right as viewed in Fig. 1, the point of such attachment has always been carried to the right of the middle of the double-tree and then in order to let each team have an equal pull some means has been provided to equalize the draft on the short and long ends.

In my form of evener I am enabled to establish perfect equilibrium between the two members A, A' without regard to where the point of attachment with the plow may be. The said point of attachment lies between the members and by changing the lengths of the latter while still retaining the measurement of 60 inches for the total length said point of attachment can be varied. Certain peculiar connections admit of this, the equilibrium being had in any such change.

The adjacent ends of the members are pivotally carried between the extremities of two Y-shaped members D, D, one being above and the other below as shown in Fig. 2. A bolt E passes through the extremity of the member A and the said members D, and a bolt F likewise is passed through the member A' and said members D thus giving a separate pivot point for each double-tree section, the adjacent ends of the latter being so formed as to permit the pivot points to lie in a line extending at right angles to the length of the double-tree as shown. Preferably a metal band G, Fig. 4, is placed upon the ends thus formed to protect them and each said band is provided with a rearwardly projecting lug or ear H connected by two links J through pivots K. It is to be understood, however, that said bands G need not be used, or, if desired, other means may be used for protecting the ends and the lugs H may be otherwise attached since I do not confine myself to the construction shown.

At L is the frame of the plow and M a clevis usually employed. N is also a clevis of which there are two as shown in Fig. 1, these being attached to the clevis M through the members N'. The diverging extremities of the members D are rigidly held in the clevises N by means of the bolts O. This construction serves to admit of the desired horizontal and vertical adjustment of the evener and at the same time holds the forward ends of the members D rigid in that no horizontal swinging motion can result.

The principle and operation of the device will now be described: The members A and A' are merely two levers of unequal length, that is, for illustration the length of the former from its pivot at E to point of attachment of the forward double-tree is say 36 inches, while that of the member A' measures 24 inches from its pivot F to the point of attachment of its forward double-tree. Now, these levers are connected by the links J described and the distance between the pivot E of the member A and a line drawn through the pivots K, K is 6 inches, while the distance between the pivot F and said line is 4 inches. With these proportions in mind let it be supposed that a weight of say 25 pounds be hung on the member A' at a point 24 inches from the pivot F. Multiplying the weight by the length of the lever we have 25×24 which gives us the product of 600, which being divided by 4 inches, as the length of the lever-arm, gives the quotient of 150 as the number of pounds pull at the lug H of said member A'. Again for the lever A taking 36 inches as its length multiplied by 25 as the same weight hung at its outer end we have 900 as the product. This divided by 6 as the length of the lever-arm gives also 150 as the pull at the lug H. The lugs H, H being connected, it being presumed that the device is suspended from the members D, the said device is in a state of equilibrium.

I have illustrated, for the sake of clearness, the two levers in Figs. 5 and 6 giving the same proposition. The measurements in Fig. 5 correspond with those already given while those in Fig. 6 are changed. As illustrating the change in the position of the point of connection with the plow and as showing how the horses can be brought into proper working position with reference to the swingle trees for direct pull, the distance between the end of the short member or lever, which corresponds to A' in Fig. 1, has been shortened to 20 inches, and the long lever has been increased in length to 40 inches, while the distance from the pivot of the latter has been increased to 8 inches, that of the short lever remaining at 4 inches. In this case taking 25 pounds as the weight to be hung from the short lever we have 25×20 or 500 which divided by 4 as the length of the lever arm gives 125 as the pull in pounds at the extremity of the lever-arm. The long lever exerts the same pull, since 25×40 gives 1000 divided by 8 inches for the lever arm produces 125 as the quotient. It is thus seen that the point of connection can be readily changed by changing the relative lengths of the levers and their arms.

As hereinbefore stated it is not advisable to alter the total length of the double-tree since 60 inches is as short as it can be used to accommodate the four swingle-trees consequently in order to make any change at all the double-tree must be shifted and my peculiar construction will readily admit of it.

In Figs. 1 and 3 means is shown at P for taking up the wear. It consists of a slotted member P for each lever, one end of each being held by the bolts E and F described. A bolt Q in the lever A and a bolt R in the lever A' permit the slotted members to be used in adjusting the levers when the holes through which the bolts E and F pass have become enlarged by the sagging of said levers due to their weight. To this, however, I attach no great importance since any other means may be used for properly supporting the members described.

It is evident that in order to have the evener operate properly the draft connection D D must be perfectly rigid on the plow and for this reason the parts of said connection D are provided with the diverging rear extremities to fasten to the two clevises.

It is also evident that the levers shown in Figs. 5 and 6 would operate equally well if their pivots were separated as shown in Fig. 7 so long as the distances between the pivots and the line of connection of the lever arms are not the same.

Should it be undesirable to greatly change the proportions of the levers A and A', relatively, from that shown in Fig. 1 to gain still more advantage in moving the evener further to the left with reference to the horses and the point of attachment with the plow, I desire to state that the front double-trees B B can be divided in the same manner as the rear one described and in that way the desired objects may be readily accomplished.

It is not the intention to confine myself in any way to any particular construction in bringing out my evener since it is the principle of providing the leverage described that will admit of readily shifting the device to the desired position while each horse is given free working room and each an equal amount of work.

I claim—

1. An evener comprising two bars of different lengths, forked members, pins carried by the shank portions of said members and upon which said bars are pivotally connected, one in advance of the other, and a link pivotally connected to said bars on opposite sides of the shank portions of said forked members, as set forth.

2. An evener comprising two bars of different lengths, forked members, pins carried by the shank portions of said members and upon which said bars are pivotally mounted, one in advance of the other, lugs projecting from the rear edges of said bars adjacent to their pivotal ends, and a link pivotally connecting said bars, as set forth.

3. An evener comprising two bars of different lengths, forked members, pins carried by the shank portions of said members and upon which said bars are pivotally mounted, one in advance of the other, straps about the inner ends of said bars, lugs projecting from said straps and the rear edges of said bars, and a link pivotally connecting said lugs, as set forth.

4. In combination with two bars of unequal lengths, to each of which a whiffle tree is adapted to be attached, fork-shaped members, pivotal pins carried thereby, adjustable straps fastened to said bars, said straps being pivotally mounted upon said pins, one in advance of the other, lugs projecting from the rear edge of each bar adjacent to its inner end, and a link pivotally connecting said lugs, as set forth.

In testimony whereof I affix my signature, in presence of two witnesses.

JEFFERSON D. BURGESS.

Witnesses:
FRANKLIN S. MARR,
EDWIN S. RITCHEY.